United States Patent [19]
Nagarajan et al.

[11] Patent Number: 5,995,672
[45] Date of Patent: Nov. 30, 1999

[54] METHOD FOR REDUCING ALPHA PLANE BIT MASK SIZE

[75] Inventors: Ram Nagarajan, Los Angeles; Peter H. Au, Hermosa Beach; Ronnie R. Burns, Irvine, all of Calif.

[73] Assignee: Hughes Electronics Corporation, El Segundo, Calif.

[21] Appl. No.: 08/745,590

[22] Filed: Nov. 8, 1996

[51] Int. Cl.⁶ ...................................................... G06K 9/34
[52] U.S. Cl. .......................................... 382/242; 382/199
[58] Field of Search ............................. 382/242, 198–204

[56] References Cited

U.S. PATENT DOCUMENTS

| | | | |
|---|---|---|---|
| 4,566,128 | 1/1986 | Araki | 382/56 |
| 4,845,765 | 7/1989 | Juvin et al. | 382/21 |
| 5,666,212 | 9/1997 | Gilge | 358/432 |

*Primary Examiner*—Thomas D. Lee
*Assistant Examiner*—Stephen Brinich
*Attorney, Agent, or Firm*—John A. Crook; Michael W. Sales

[57] ABSTRACT

A method is provided for reducing the number of data bits required for storage or transmission of the data representing the alpha masks of objects in a single image or frame of a video sequence by jointly encoding overlapping boundaries between two adjacent objects within the image and by avoiding redundant encoding and transmission of an alpha mask which can be reconstructed from other encoded alpha mask data.

13 Claims, 2 Drawing Sheets

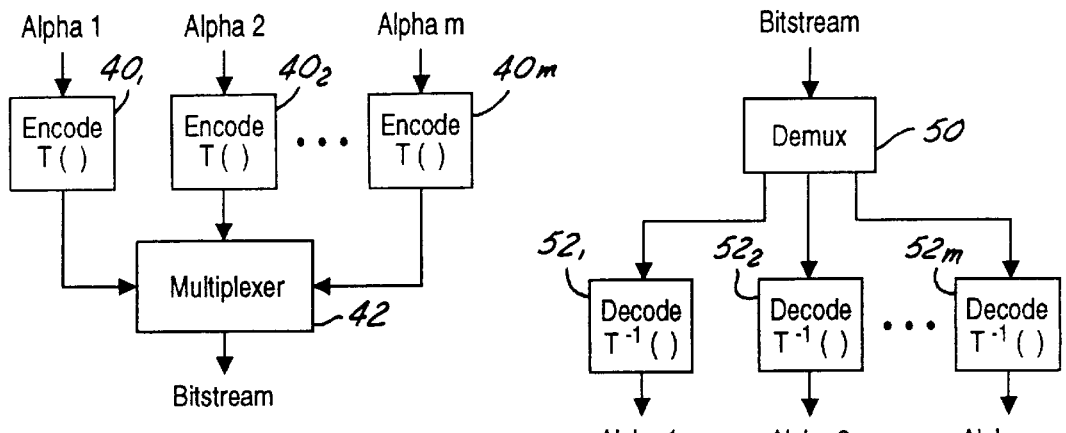
FIG.8
FIG.9
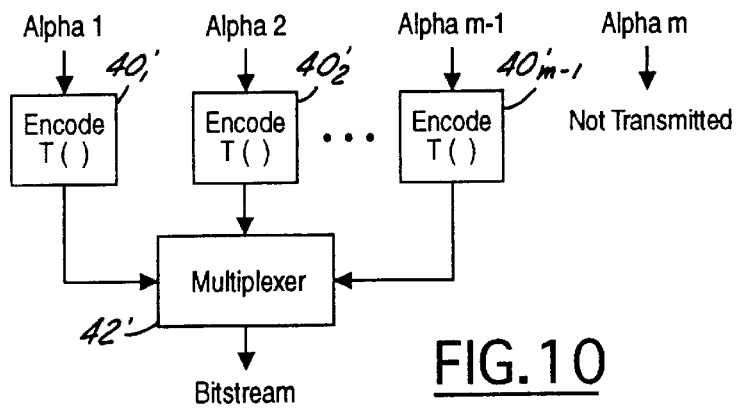
FIG.10
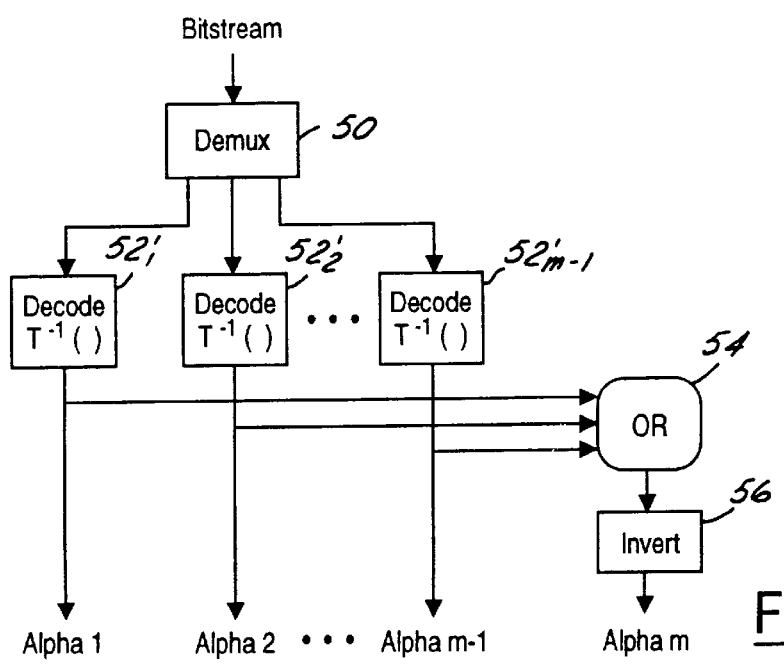
FIG.11

METHOD FOR REDUCING ALPHA PLANE BIT MASK SIZE

TECHNICAL FIELD

The present invention is directly generally to the encoding of objects or layers in a still image or frame of video sequences in preparation for transmission, and, more particularly, to the efficient encoding of the alpha planes associated with such objects or layers by jointly coding the contours of each of said alpha masks when necessary for reconstruction or providing for the reconstruction of the alpha planes from other encoded data to avoid redundant coding.

BACKGROUND ART

In preparing single still images or a frame of a video sequence for storage or for transmission, the objects contained within the image or frame are divided into foreground and background planes. These planes are referred to as alpha planes.

The traditional method of encoding the multiple alpha planes of the still image or frame of video sequence composed of multiple objects is to compress each plane independently. One common method of encoding the alpha masks of various objects in a frame is to encode the contour of each object's alpha mask independently. If the alpha mask of an object is in gray scale, the intensity of the interior of alpha mask is also encoded for that object.

This approach is inefficient, however, since it does not take advantage of the correlation between the alpha planes. Further, in some computer graphic application, the background layer often does not have an alpha mask associated with it as it was held to exist everywhere on the image and was included as appropriate by the foreground objects or planes.

The necessity for the background layer to have an alpha mask associated with it arises in low bit rate coding applications where the areas of the background not visible in the scene will not be transmitted. Some current video models, for example, require that explicit alpha masks for the background be available so that the encoder can correctly fill in the regions in which the background exists before transformation with a discrete cosine transform. Thus, the decoder also requires that the background alpha mask be transmitted to it so that the background layer can be decoded correctly. By way of example, with the current MPEG 4 low bit rate video verification models, the losslessly encoded alpha mask of the background layer of a test sequence requires approximately 2500 bits per frame. For a sequence compressed at 128 kilobits per second, with 10 frames per second, the alpha mask of the background layer alone constitutes about 20% of the final bit rate. Additionally, the coding of each alpha mask independently is inefficient since it does not take advantage of the correlation between the alpha planes intersection or overlap, in addition to the masking effect of the foreground planes.

SUMMARY OF THE INVENTION

The present invention is directed to providing a method which overcomes the deficiencies of the prior art by providing for a reduction in the number of bits necessary for the storage or transmission of the alpha planes by jointly coding the contours whenever there is overlapping or intersection of objects. Further, the present invention augments the current art by permitting alpha planes, which can be reconstructed from other alpha planes in the image, to be eliminated. The method, therefore, provides a significant efficiency gain of the encoded alpha planes by not encoding the shared sections of the contours and permitting a reduction in the total number of bits necessary to encode all of the alpha planes of the frame.

BRIEF DESCRIPTION OF THE DRAWINGS

FIG. 7a is a representation of one possible plane during reconstruction of the alpha plane of FIG. 3a;

FIG. 7b is a representation of another possible plane during reconstruction of the alpha plane of FIG. 3a;

FIG. 8 is a block diagram of an encoder utilizing the prior art;

FIG. 9 is a block diagram of a decoder utilizing the prior art;

FIG. 10 is a block diagram of an encoder utilizing the present invention; and

FIG. 11 is a block diagram of a decoder utilizing the present invention.

BEST MODE FOR CARRYING OUT THE INVENTION

The present invention is applicable to both standard categories of alpha planes, i.e., both binary and gray scale planes. In the case gray scale alpha masks, the contours can be encoded with a method described in this invention while the intensity values inside the contours of the mask can be encoded separately.

When there are multiple alpha masks for objects in a single frame of a video sequence or a still image, the masks often intersect or overlap. In these cases, encoding each of the contours independently results in sections of the contour being encoded multiple times. The present invention utilizes joint contour coding of the alpha mask to eliminate this redundancy. The aggregate links of all the contours coded utilizing the present invention is less than that under the traditional approach, often resulting in a significant reduction in the data needed to represent the alpha masks.

Additionally, the present invention provides for further reduction in the number of bits required to be encoded for storage or transmission by providing a method of reconstructing a plane from other planes within the picture or video frame.

Figure 1:
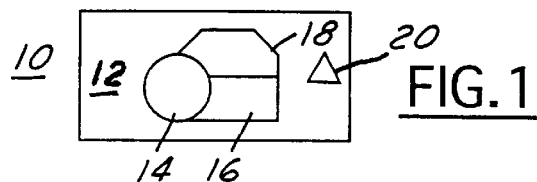
FIG. 1 is a two-dimensional drawing illustrating a frame having five alpha planes or objects within the frame.
Figure 2A:
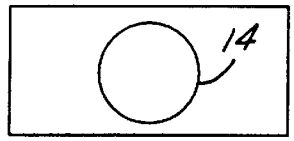
FIG. 2a is a two-dimensional representation of the frame of FIG. 1 illustrating the traditional method of depicting one of the alpha planes of the frame.
Figure 2B:
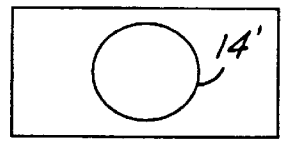
FIG. 2b is a two-dimensional representation of the frame of FIG. 1 illustrating utilization of the present invention in depicting the alpha plane of FIG. 2a selected as the primary alpha map.

Referring now to FIG. 1, there is shown a frame 10 incorporating several alpha planes forming an object within the frame 10. As shown, the various alpha planes 12,14,16, 18 have contours which intersect and jointly share some portion of their contours. By selecting one of the alpha planes as a primary, the contour of that plane is encoded completely. In the remaining alpha planes, referred to as secondary planes, those contours for which share one or more sections with another plane are not encoded, rather utilizing the shared segment for reconstruction.

Referring now to FIGS. 2a, 3a, 4a and 5a, utilizing the traditional method of encoding, the primary and secondary alpha planes are depicted at 14,16,18 and 20. As shown, each alpha plane, both primary and secondary, is completely encoded, compressed, and prepared for storage or transmission.

Referring now to FIGS. 2b, 3b, 4b and 5b, the method utilizing the present invention is shown. As in the traditional mode, the primary alpha plane 14' is completely encoded. This is the basis for the usage of encoded portions or segments of the primary alpha plane 14' to be utilized with the secondary alpha plane encoding.

Figure 3A:
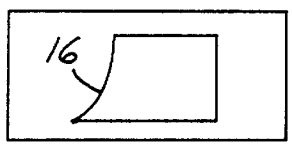
FIG. 3a is a representation of another alpha plane from FIG. 1 utilizing the traditional method of mapping.
Figure 3B:
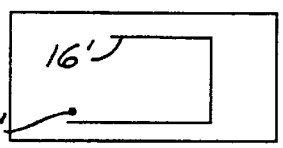
FIG. 3b is the alpha map of FIG. 3a selected as a secondary alpha plane utilizing the present invention.

Referring now particularly to FIG. 3b, the segment of secondary alpha plane 16' shared in common with primary alpha plane 14' is not encoded. Only the points of contact and of departure with plane 14' and the remainder of secondary alpha plane 16' that are not in contact with the primary alpha plane 14', are encoded with one exception, as will be hereinafter explained.

Figure 4A:
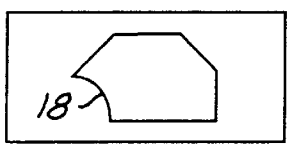
FIG. 4a is a representation of still another alpha plane of FIG. 1 utilizing the traditional mapping method.
Figure 4B:
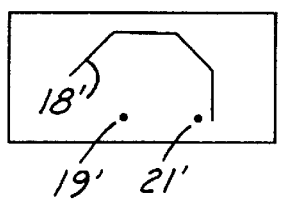
FIG. 4b is the alpha plane of FIG. 4a utilizing the mapping techniques of the present invention.

Referring now to FIG. 4b, secondary alpha plane 18' is encoded along with the segments not in contact with primary alpha plane 14' or secondary alpha plane 16', with the exceptions of the points of secondary alpha plane 18' that are in common with both the primary alpha plane 14' and the secondary alpha plane 16'. As above mentioned with respect to FIG. 3b, additional points will be taken as hereinafter explained in order to more clearly delineate the actual shape of the secondary alpha plane 18'.

Figure 5A:
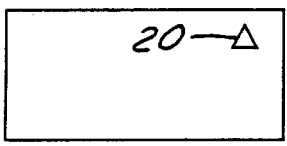
FIG. 5a is a representation of the alpha plane of an object in the frame of FIG. 1 having no common segments with the other alpha planes of FIG. 1.
Figure 5B:
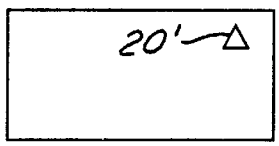
FIG. 5b is the alpha plane of FIG. 5a utilizing the present invention.
Figure 6:
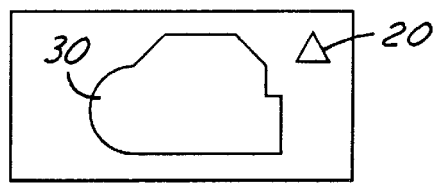
FIG. 6 is a representation of an outline of the alpha planes of FIG. 1 with respect to the background of the frame.

Referring now to FIG. 5b, there is shown an alpha plane 20' having no intersections with either the primary alpha plane 14' or the two secondary alpha planes 16' or 18'. Accordingly, alpha plane 20', although considered a secondary alpha plane, is completely encoded.

In order to reconstruct correctly the contours of the secondary alpha planes, without completely encoding the alpha plane as in the prior art, it sometimes becomes necessary to takes several points along the contour of the primary or other secondary alpha planes where the alpha plane being encoded shares a common boundary. Referring again to FIG. 3b, such a point 17' is shown to indicate the curve of the boundary secondary alpha plane 16' that is shared with the primary alpha plane 14'.

Figure 7A:
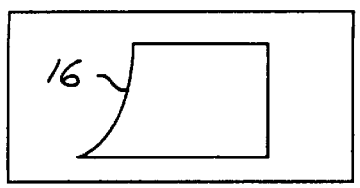
Figure 7B:
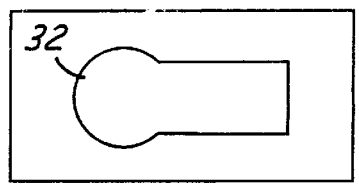

Without such additional points taken along the common boundary as shown in FIG. 3b, either the curve 16 of FIG. 7a or the curve 32 of FIG. 7b could be correct. However, once the point 17' in common between the primary alpha plane 14' and secondary alpha plane 16' is taken into account, it becomes apparent that the correct contour of secondary alpha plane 16' is that shown as 16 in FIG. 7a.

Further, and referring now to FIG. 4b, additional points 19' and 21' may be taken as necessary to indicate the position of the secondary alpha plane 18' with respect to the common boundary with either primary alpha plane 14' or secondary alpha plane 16'. Thus, by coding the extra points beyond the intersections of a secondary alpha plane with another plane, it uniquely selects the contour of the secondary alpha plane so as to correctly reconstruct the contour.

As above mentioned, additional encoding efficiencies of the alpha planes associated with different objects of layers in a still image or frame of a video sequence may be obtained by avoiding the redundant encoding of an alpha plane if it can be reconstructed from the other encoded alpha planes.

In the prior art, the encoded alpha planes 14',16',18' and 20' along with the background 12 would be further encoded as shown in FIG. 8. As an example, letting alpha plane 14' be referenced as Alpha 1, 16' as Alpha 2, etc. with background alpha plane 12 referenced as Alpha m, the alpha planes are coupled through encoders $40_1, 40_2, \ldots 40_m$ into multiplexer 42, where the signals are combined for storage or transmission as a bitstream.

Referring now to FIG. 9, the bitstream is received into a demultiplexer 50, separated into the separate encoded alpha planes, coupled through their respective decoders $52_1, 52_2, \ldots 52_m$ and transmitted for reconstruction as the original frame or picture. Note that the bitstream may be stored for later retrieval rather than transmitted.

In the present invention, and referring now to FIG. 10, the encoded alpha planes 14', 16' and 18' are further encoded as was shown in FIG. 8. As an example, letting alpha plane 14' be referenced as Alpha 1, 16' as Alpha 2, and 18' as Alpha m−1, these alpha planes are coupled through encoders $40'_1, 40'_2, 40'_{m-1}$ into multiplexer 42', where, as above described, the signals are combined for storage or transmission as a bitstream. In the present invention, however, and with background alpha plane 12 referenced as Alpha m, the background alpha plane 12 is not further encoded for storage or transmission.

The encoded signals Alpha 1, Alpha 2, . . . Alpha m−1, and referring now to FIG. 11, are retrieved from storage or received via transmission and coupled into demultiplexer 50 as previously shown in FIG. 9. As above described, the signals are separated into the separate encoded alpha planes, coupled through their respective decoders $52'_1, 52'_2, \ldots 52'_{m-1}$ and transmitted for reconstruction as the original frame or picture. In the present invention however, the outputs of decoders $52'_{1, 2, \ldots m-1}$ are sampled with the samples coupled through an OR circuit 54. OR circuit 54 combines the decoded signals to provide a composite of the alpha planes 14', 16' and 18'. This composite signal is inverted in inverter 56 so as to provide the negative of the union of the alpha planes of the foreground objects which is effectively the non-transmitted background alpha plane 12. Accordingly, the present invention effectively eliminates the requirement for encoding and transmitting alpha planes which can be reconstructed from information embodied in the alpha planes actually transmitted.

Although particular embodiments of the present invention have been illustrated in the accompanying drawings and described in the foregoing detailed description, it is to be understood that the present invention is not limited to just the embodiments disclosed, but that they are capable of numerous rearrangements, modifications, and substitutions without departing from the scope of the claims hereafter.

What is claimed is:

1. A method for encoding multiple objects in an image, each image having a contour, by reducing the number of data bits required for reconstruction of the image, comprising the steps of:

selecting one object as a primary object and classifying the remaining of said multiple objects as secondary objects;

recording all data points encountered during a traverse of the contour of the primary object;

selecting a first secondary object which intersects with the primary object and is overlapped thereby, recording all data points not shared with the contour of the primary object during a traverse of the contour of the first secondary object; and encoding each set of recorded data points for processing.

2. The method of claim 1 including the step of selecting as the primary object an object not overlapped by any remaining objects in the image.

3. The method of claim 2 further including the step of recording each point of intersection between the primary object and the first secondary object and including each intersection point with the data recorded for the first secondary object.

4. The method of claim 3 including the steps of selecting another secondary object having intersections with at least one of the primary object or the first secondary object and recording all data points not shared therewith during a traverse of the another secondary object.

5. The method of claim 1 further including the step of recording at least one data point along the shared contour between the primary object and the first secondary object and between points of intersection defining such shared contour.

6. The method of claim 4 further including the step of recording at least one data point along any shared contour between either of the primary object and the first secondary object and said another secondary object and between points of intersection defining such shared contour.

7. The method of claim 6 including the steps of recording data points along the contours of any remaining secondary objects not shared with the contours of previously recorded object contours, including recording at least a data point along the common contour between the remaining secondary objects and the previously recorded objects.

8. The method of claim 7 wherein the image is a binary representation of the objects.

9. The method of claim 7 wherein the image is a grayscale representation of the objects.

10. The method of claim 9 including the step of encoding intensity values within the contours of each object in the image is encoded separately.

11. The method of claim 1 including the step of recording all data points encountered during a traverse of the contour of any secondary object in said image not having an intersection with the primary object or any secondary object and encoding the data.

12. A method for encoding multiple objects in an image, each image having a contour, by reducing the number of data bits required for reconstruction of the image, comprising the steps of:

selecting as a primary object an object not overlapped by any remaining objects in the image and classifying the remaining of said multiple objects as secondary objects;

recording all data points encountered during a traverse of the contour of the primary object;

selecting a first secondary object which intersects with the primary object and is overlapped thereby, recording all data points not shared with the contour of the primary object during a traverse of the contour of the first secondary object;

recording each point of intersection between the primary object and the first secondary object and including each intersection point with the data recorded for the first secondary object;

selecting another secondary object having intersections with at least one of the primary object or the first secondary object and recording all data points not shared therewith during a traverse of the another secondary object;

recording at least one data point along any shared contour between either of the primary object and the first secondary object and said another secondary object and between points of intersection defining such shared contour;

recording data points along the contours of any remaining secondary objects not shared with the contours of previously recorded object contours, including recording at least a data point along the common contour between the remaining secondary objects and the previously recorded objects;

comparing each set of recorded data points;

determining any recorded data point set capable of being reconstructed from the remaining data point sets; and encoding only said remaining data point sets and transmitting or storing same for later reconstruction of the image.

13. The method of claim 12 including the steps of:

receiving the encoded remaining data point sets and decoding same to reconstruct the remaining data point sets;

sampling the reconstructed data point sets;

'OR'ing the samples to provide a composite of the objects;

inverting the composite of the 'OR'ed samples for reconstructing any data point set not included in said remaining data point sets and not encoded for transmitting or storing.

* * * * *